United States Patent
Liang et al.

(10) Patent No.: US 7,098,409 B2
(45) Date of Patent: Aug. 29, 2006

(54) APPARATUS FOR WEIGHING MATERIALS ONLINE

(75) Inventors: Manchun Liang, Beijing (CN); Zhikang Zhang, Beijing (CN); Hongchang Yi, Beijing (CN); Qian Lin, Beijing (CN); Yonggeng Qian, Beijing (CN)

(73) Assignee: Tsinghua University, (CN)

( * ) Notice: Subject to any disclaimer, the term of this patent is extended or adjusted under 35 U.S.C. 154(b) by 0 days.

(21) Appl. No.: 10/524,901

(22) PCT Filed: Aug. 14, 2003

(86) PCT No.: PCT/CN03/00680

§ 371 (c)(1),
(2), (4) Date: Feb. 16, 2005

(87) PCT Pub. No.: WO2004/017030

PCT Pub. Date: Feb. 26, 2004

(65) Prior Publication Data

US 2005/0241862 A1 Nov. 3, 2005

(30) Foreign Application Priority Data

Aug. 16, 2002 (CN) ............... 02 1 28861

(51) Int. Cl.
*G01G 9/00* (2006.01)
*G01B 11/24* (2006.01)

(52) U.S. Cl. ....................................... 177/1
(58) Field of Classification Search ............ 177/1, 177/16, 17

See application file for complete search history.

(56) References Cited

U.S. PATENT DOCUMENTS

| 3,278,747 A | * | 10/1966 | Ohmart ................... 378/54 |
| 3,545,610 A | * | 12/1970 | Kelly et al. .............. 209/579 |
| 3,796,873 A | * | 3/1974 | Ledgett .................. 378/54 |
| 4,147,618 A | * | 4/1979 | Richardson et al. ....... 378/89 |
| 4,238,956 A | * | 12/1980 | Sniezek et al. ........... 73/861.01 |
| 4,356,874 A | * | 11/1982 | Blincow et al. .......... 177/210 FP |

(Continued)

FOREIGN PATENT DOCUMENTS

JP 03-41306 A * 2/1991

(Continued)

OTHER PUBLICATIONS

International Search Report dated Nov. 6, 2003, for International Application No. PCT/CN2003/000680.

*Primary Examiner*—Randy W. Gibson
(74) *Attorney, Agent, or Firm*—Bingham McCutchen LLP

(57) ABSTRACT

An apparatus for weighing materials online is disclosed, which belongs to an art of online weighing of material. The apparatus comprises: a light-emitting unit, emitting light beams irradiating on the surface of materials transported on a belt to form a bright projection which has the same shape as that of a upper contour of a cross-section of the material; and a CCD camera for continuously picking up images of the bright projection on the upper contour of the cross-section of the material; and an image capture unit, connected to the CCD camera for continuously capturing the images; and a central processing unit, connected to the image capture unit for processing the images captured by the image capture unit to compute a weight of the material. The present invention has many advantages, such as, high precision, good reliability and stability, which applies to the belt without a constant speed and a condition that a bulk shape and the bulk density of the material change largely. And the radiation safety of the present invention is good.

11 Claims, 2 Drawing Sheets

U.S. PATENT DOCUMENTS

| | | | |
|---|---|---|---|
| 4,720,808 A | * | 1/1988 | Repsch ........................ 702/175 |
| 5,099,118 A | * | 3/1992 | Francis ........................ 250/308 |
| 5,184,733 A | * | 2/1993 | Arnarson et al. ........... 209/585 |
| 5,291,422 A | * | 3/1994 | Esztergar ..................... 702/30 |
| 5,319,160 A | * | 6/1994 | Nambu .................... 177/25.18 |
| 5,561,274 A | * | 10/1996 | Brandorff ................... 177/145 |
| 5,585,603 A | * | 12/1996 | Vogeley, Jr. ............. 177/25.13 |
| 5,753,866 A | * | 5/1998 | Ikeda et al. ............... 177/25.18 |

FOREIGN PATENT DOCUMENTS

| JP | 9029693 A | 2/1997 |
|---|---|---|
| JP | 2000230809 A | 8/2000 |
| JP | 2002005637 A | 1/2002 |

* cited by examiner

APPARATUS FOR WEIGHING MATERIALS ONLINE

CROSS-REFERENCE TO RELATED APPLICATIONS

This application claims priority under 35 § U.S.C. 119 to Chinese Application No. 02128861.5 filed Aug. 16, 2002, which is hereby incorporated by reference in its entirety for all purposes as if fully set forth herein.

FIELD OF THE INVENTION

The invention relates to an apparatus for weighing materials online, more particularly, relates to an apparatus for dynamically weighing materials transported on a conveyor.

BACKGROUND OF THE INVENTION

Now two popular apparatus for online weighing are electronic belt scale and nuclear belt scale.

The common ground of the two apparatus lies in that both of them measure the load of materials on a conveyor belt and the speed of the belt, then get an instantaneous flux through multiplying the load by the speed, and finally obtain the cumulative weight of the material within a period of time through an integral or a summation operation.

The difference of these two apparatus lies in:

The electronic belt scale performs a contacting measurement by means of a pressure sensor, and determines the material load by measuring the weight of the material in a given area of the belt with a given length. If the flux is big, the accuracy of the electronic belt scale is high. But while the speed of the belt's movement is relatively high, the accuracy will decrease obviously. The electronic belt scale always has a huge size and a complicated structure, especially the one with better accuracy. And as it employs the contacting style measurement, the varieties of many factors can make great effect on measurement accuracy, such as change in tension of the belt, change in hardness of the belt and movement deviation of the belt. Therefore electronic belt scales need elaborate maintenance to keep steady accuracy.

The nuclear belt scale performs a non-contacting measurement, determining the material load by measuring the radiation absorption of the material. Nuclear belt scale has many features, such as, small volume, less maintenance and good stability. But under a condition of big flux and high load, due to the power limitation of a radioactive source, the intensity of the radiation having passed through the material and received by a detector is too low, which will influence the accuracy. Additionally, the changes in characteristics of the material, such as, the variety, composition, amount of water included and the change in the shape of a cross-section on the belt may influence the measurement accuracy. Therefore, nuclear belt scale has a low accuracy in general. And a complicated calibration needs to be done to ensure that the nuclear belt scale works well.

Although the nuclear belt scale and the electronic belt scale have their own advantages and disadvantages, they both can not meet the requirements of high precision and high reliability in some industries, such as metallurgy industry, chemical industry, and mining industry. It is an urgent affair to seek an online weighing apparatus with high precision, high stability, easy operation, and easy maintenance.

SUMMARY OF THE INVENTION

This invention is directed to a problem that a contacting online weighing apparatus depends too much on the stability of mechanism, and the disadvantages of a non-contacting online weighing apparatus, such as nuclear belt scale. And one object of this invention is to provide an online weighing apparatus which is simple in structure and in non-contacting style.

Another object of this invention is to make this online weighing apparatus not only work well in the case that a bulk density of the material is relatively constant, but also work well in the case that the bulk density changes largely, a high accuracy of the measurement is demanded at the same time and the speed of the belt is changeable.

For the first object, the online weighing apparatus of the present invention comprises: a light-emitting unit for emitting light beams to irradiate on a surface of the material transported on the belt to form bright projections in the same shape as that of the material; a CCD camera for continuously picking up images of the bright projections on the cross-section of the material; an image capture unit that connects to the CCD camera for continuously capturing the images; and a central processing unit that connects to the image capture unit for processing the images captured and computing the weight of the material.

For the second object, a speed sensor and a γ ray emitting and detecting apparatus are added to the invention.

BRIEF DESCRIPTION OF THE DRAWINGS

The invention is explained in further detail, and by way of example, with reference to the accompanying drawings wherein.

Throughout the drawings, the same reference numerals indicate similar or corresponding features or functions.

DETAILED DESCRIPTION OF THE DRAWINGS

The invention will be described in detail with drawings and the preferred embodiment.

Figure 1:
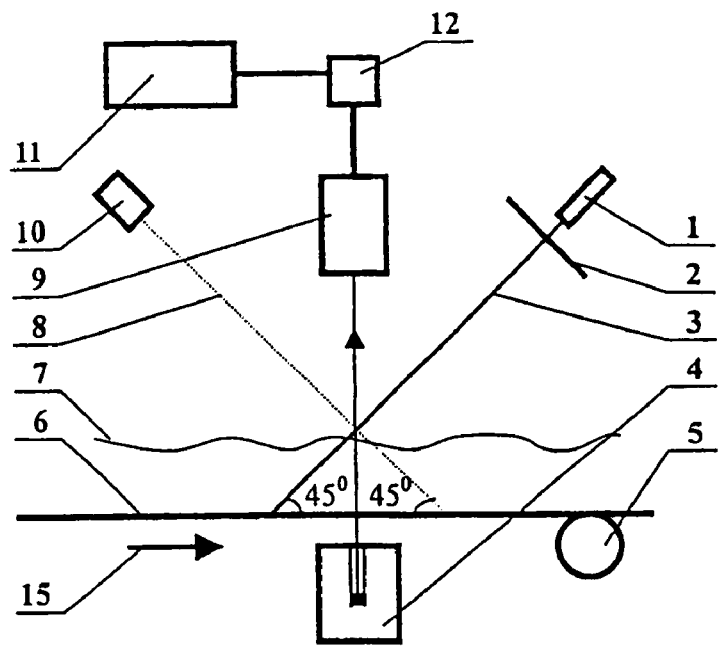
FIG. 1 is a block diagram of a preferred embodiment of the invention.

The preferred embodiment of this invention is shown in FIG. 1. FIG. 1 provides a layout of the apparatus and the geometrical position of a camera, a laser, a γ ray source, and a detector from a side view of the conveyor. As shown in FIG. 1, the structure of this embodiment comprises the following five parts: a laser source, a CCD camera, a speed sensor, a γ ray source and a γ ray detecting unit.

Figure 2:
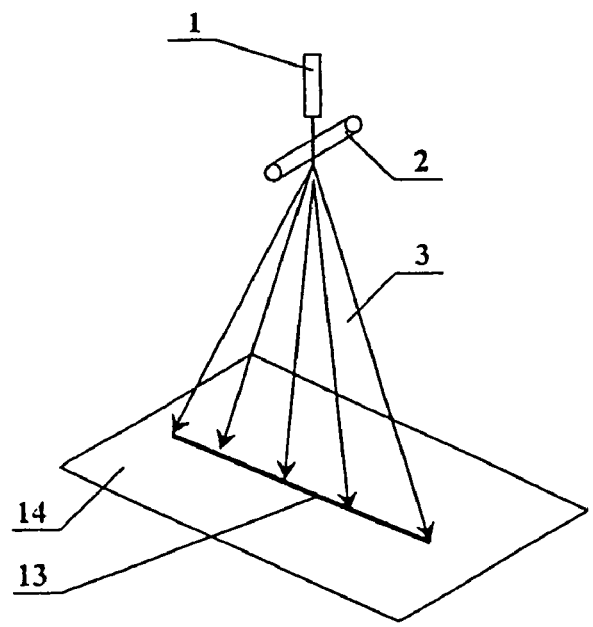
FIG. 2 is a block diagram of a laser source of the invention.

The laser source consists of a dot-spot laser 1 and a glass rod 2 to generate a line-spot fan-shaped laser beam 3, and the angle between the laser beam and the conveyor 6 is 45 degree. FIG. 2 provides the details. The CCD camera 10 is a commercially available two-dimensional array CCD having 320*240 pixels for picking up images and converting them into video signals. The video signals are fed into a computer through an image capture card. Each captured image contains the cross-section shape information of the material. The angle between the lens axis of the CCD camera 8 and the conveyor 6 is 45 degree, thus the optical axis of the CCD camera 10 is perpendicular to the plane of the fan-shaped laser beam 3. The speed sensor 5 is a Hall element installed on a shaft of the conveyor to determine the speed of the conveyor along the movement direction 15, and the output of the speed sensor is a voltage pulse signal between 0 v and 5 v gathered and processed by a microprocessor 11. The γ ray emitting and detecting means comprises a γ ray radiation source and a container 4 under the conveyor, γ ray detector 9 and γ ray signal processing circuit 12 upon the conveyor. The γ ray radiation source uses a $^{137}Cs$ granule radiation source, which is collimated and emits a narrow γ ray beam. The γ ray signal processing circuit 12 sends the detected γ ray signal to the microprocessor for calculating the material density.

The preferred embodiment of the laser source is shown in FIG. 2. The power of the dot-spot laser 1 is 5 mW, and the diameter of the beams is less than 3 mm within 1 m length. The laser beam penetrates the glass rod 2 which is perpendicular to it and then expands into the line-spot fan-shaped laser beam 3. The diameter of the glass rod 2 is about 4 mm. When the laser beam 3 is fed to a reference plane 14, a line spot 13 will be formed thereon. In this invention, the line spot 13 is provided to the conveyor and then a bright projection on the whole upper contour of the cross-section of the material is formed. So the width of the line spot 13 should be larger than the biggest width of the material to cover the full cross-section.

Figure 3:
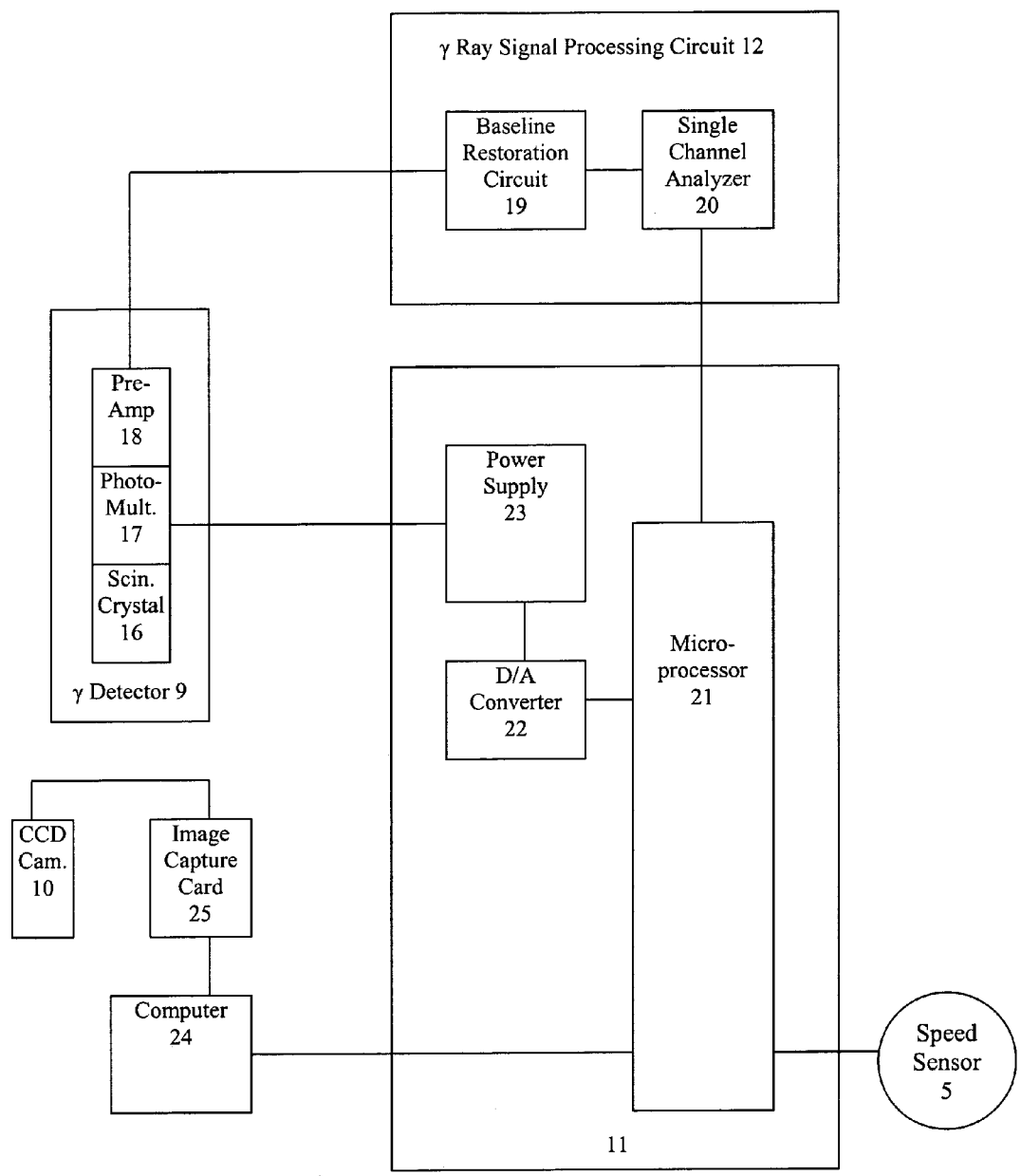
FIG. 3 is a circuit diagram of a preferred embodiment of the invention.

A circuit diagram of the preferred embodiment is shown in FIG. 3. Computer 24 is an industrial computer for industrial control. The computer 24 gathers images from the CCD camera 10 through a common image capture card 25. The data are transferred between the computer 24 and the microprocessor 21 by means of serial communication. The microprocessor 21 could be an 89C51 which can measure the γ ray flux density and the speed v of the conveyor 6 at the same time. Both the microprocessor 21 and the industrial computer 24 belong to the signal gathering and processing part, and can be treated as a center processing unit as a whole. The γ ray detector 9 consists of a NaI (Tl) scintillation crystal 16, a photomultiplier 17, and a preamplifier 18 connected closely in series. Wherein the NaI (Tl) scintillation crystal 16 receives the γ ray which has penetrated the material on the conveyor and generates optical signals corresponding to the y ray energy; and the photomultiplier 17 transforms the optical signals from the scintillation crystal into electric signals; and the preamplifier 18 amplifies the electric signals generated by the photomultiplier and then provides the amplified electric signals to the γ ray signal processing circuit 12. The photomultiplier 17 is powered by a 0~1000v controllable high voltage DC power supply. D/A converter 22 adjusts the voltage of the power supply under the control of the microprocessor 21 so as to stabilize the γ ray energy spectrum. The γ ray signal processing circuit 12 consists of a baseline restoration circuit 19 and a single channel analyzer 20 connected in series. The circuits of the preamplifier 18, the baseline restoration circuit 19, and the single channel analyzer 20 can be referred to the book *Nuclear Electronics* (Wangjingjin, Atomic Press, China, 1983).

The following describes the weighing process of the embodiment of this invention in details with reference to FIG. 1.

Before weighing, parameters for optical imaging part of the apparatus must be calibrated. Firstly, under the condition that there is no material on the conveyor, images of the bright projection projected on the conveyor 6 are picked up by the CCD camera, and then the shape and the position of the conveyor surface are determined as a nether contour of the cross-section of the material. When the material passes by on the conveyor, the position (pixel with the least gray) of the bright projection picked up by the camera, represents an upper contour of the cross-section of the material. The computer counts the number n of pixels between the nether and the upper contour of the cross-section. As shown in FIG. 1, the axis of the CCD camera 10 is perpendicular to the plane of the fan-shaped beam 3, therefore the real cross-section area S of the material is in direct proportion to the number n. The proportion factor between S and n is denoted as A, and A can be determined by on-the-spot calibration. While practically measuring, the cross-section area S could be calculated by the factor A and the number n.

If the bulk density of the material changes relatively large and a better accuracy of measurement is demanded, the γ ray emitting and detecting apparatus should be added in the apparatus of this invention. Therefore, the flux density $I_0$ of the γ ray in a case that there is no material should be calibrated before practically measuring.

While practically measuring, the CCD camera 10 picks up images with a constant frequency, and sending the images to the computer via the image capture card. Supposing during a time interval T, N times of sampling are performed, the number of pixels between the nether and the upper contour of the cross-section of the $i^{th}$ sampling is denoted as $n_i$, and the cross-section area of the $i^{th}$ sampling is denoted as $S_i$. $S_i$ is calculated according to the pre-calibrated factor A by this equation: $S_i = A\, n_i$. The angle between the axis 8 and the plane of the fan-shaped beam 3, and the angle between the fan-shaped beam 3 and the conveyor 6 are both pertinent to the pre-calibrated factor A. If either of these two angles changes, the factor A must be calibrated again. Supposing the speed of the conveyor at the $i^{th}$ sampling is $v_i$, during the time interval T, the volume V of the material passed by the conveyor can be calculated by this equation:

$$V = \sum_{i=1}^{N}(v_i S_i).$$

If the bulk density of the material is approximately a constant p, the mass M of the material passed by the conveyor during the time interval T is: M=ρV, the weight $$W = Mg = \rho g \sum_{i=1}^{N}(v_i S_i),$$

wherein g is acceleration of gravity.

When the bulk density changes little or a common accuracy of measurement is demanded, the bulk density p of the material could be treated as a constant and be determined by calibration.

When the bulk density changes largely and a better accuracy of measurement is demanded, the γ ray emitting and detecting apparatus comprising the γ ray source 4, the γ ray detector 9 and the γ ray signal processing circuit 12 should be added to the apparatus of this invention. According to the attenuation law, the mass thickness of the material can be measured at the point where γ ray penetrates the material. Supposing the flux density of the γ ray is I when there is material on the conveyor under the condition of practical measurement. The mass thickness ρd of the material can be calculated according to the pre-calibrated $I_0$ by the equation: $\rho d=K(LnI_0-LnI)$, wherein the unit of $\rho d$ is usually g/cm$^2$, and the constant factor K can be determined by calibration. When the computer analyses the images, the mean bulk thickness d of the material at the point of γ ray penetrating can be computed, so the bulk density ρ of the material is: $\rho=\rho d/d=K(LnI_0-LnI)/d$, therefore the precise weight of the material passed by the measuring point during an interval can be calculated by: $W=Mg=\rho Vg$.

Obviously, other light sources rather than laser source, and other forms of beams rather than fan-shaped beams can be employed in the volume measurement.

ADVANTAGEOUS EFFECTS

Through the detailed description in combination with the drawings, it is clear that as an non-contacting online weighing apparatus, the present invention asks for little demand on the mechanism stability of the conveyor belt, has a simple structure, and performs a stable measurement; this apparatus determines the bulk volume of the material by the CCD camera picking up the images of the cross-section of the material; and the optional γ ray source and γ ray detector system can be chosen to make the apparatus adapt to the condition that the bulk shape and the bulk density of the material vary greatly and obtain a better accuracy; and the optional speed sensor thereof makes the apparatus adapt to the condition that the speed of belt is not constant; and as the optional γ ray source is a point source with a low activity, easy to be shielded and with good radiation safety. These advantages of the invention make the apparatus have a wide use in chemical industry, metallurgical industry, mining industry and many other fields.

While the invention has been described in conjunction with specific embodiments, it is evident that many alternatives, modifications and variations will be apparent to those skilled in the art in light of the foregoing description. Accordingly, it is intended to embrace all such alternatives, modifications and variations as fall within the spirit and scope of the appended claims.

What claimed is:

1. An apparatus for weighing materials online, comprising:
   a light-emitting unit, emitting light beams irradiating on the surface of materials transported on a belt to form a bright projection which has the same shape as that of a upper contour of a cross-section of the material;
   a CCD camera for continuously picking up images of the bright projection on the upper contour of the cross-section of the material;
   an image capture unit, connected to the CCD camera for continuously capturing the images; and
   a central processing unit, connected to the image capture unit for processing the images captured by the image capture unit to compute the weight of the material.

2. The apparatus of claim 1, wherein said light-emitting unit further includes a laser and a beam-forming optics unit, wherein a beam emitted by the laser passes through the beam-forming optics unit to form a line-spot fan-shaped beam.

3. The apparatus of claim 2, wherein the width of the line-spot fan-shaped beam shall be larger than the maximum width of the material on the belt.

4. The apparatus of claim 1, further comprising a speed sensor connected to said central processing unit for determining the speed of the belt.

5. The apparatus of claim 4, wherein said speed sensor is a Hall device settled on a conveyor shaft.

6. An apparatus for weighing materials online comprising:
   a light-emitting unit, emitting light beams irradiating on the surface of materials transported on a belt to form a bright projection which has the same shape as that of a upper contour of a cross-section of the material:
   a CCD camera for continuously picking up images of the bright projection on the upper contour of the cross-section of the material:
   an image capture unit, connected to the CCD camera for continuously capturing the images; and
   a central processing unit, connected to the image capture unit for processing the images captured by the image capture unit to compute the weight of the material:
   a γ ray source under the belt for emitting γ ray which passes through the material transported the belt;
   a γ ray detecting unit for detecting the γ ray which has passed through the material to obtain a γ ray signal;
   a γ ray signal processing unit for processing said γ ray signal; and
   wherein said central processing unit computes a bulk density of the material according to a processed γ ray signal and obtains the weight of the material.

7. The apparatus of claim 6, wherein said γ ray detecting unit includes:
   a scintillating crystal for receiving said γ ray and generating a corresponding optical signal at the stimulation of the γ ray;
   a photomultiplier tube for converting said optical signal to an electric signal; and a preamplifier circuit for amplifying the electric signal of said photomultiplier tube and providing an amplified electric signal to said γ ray signal processing unit.

8. The apparatus of claim 6, wherein said light-emitting unit further includes a laser and a beam-forming optics unit, wherein a beam emitted by the laser passes through the beam-forming optics unit to form a line-spot fan-shaped beam.

9. The apparatus of claim 8, wherein the width of the line-spot fan-shaped beam shall be larger than the maximum width of the material on the belt.

10. The apparatus of claim 6, further comprising a speed sensor connected to said central processing unit for determining the speed of the belt.

11. The apparatus of claim 10, wherein said speed sensor is a Hall device settled on a conveyor shaft.

* * * * *